United States Patent
Zhu et al.

(10) Patent No.: US 8,738,795 B2
(45) Date of Patent: May 27, 2014

(54) MEDIA-AWARE AND TCP-COMPATIBLE BANDWIDTH SHARING FOR VIDEO STREAMING

(75) Inventors: Xiaoqing Zhu, Nanjing (CN); Rong Pan, Sunnyvale, CA (US); Vijaymarayanan Subramanian, Sunnyvale, CA (US); Flavio Bonomi, Palo Alto, CA (US)

(73) Assignee: Cisco Technology, Inc., San Jose, CA (US)

( * ) Notice: Subject to any disclaimer, the term of this patent is extended or adjusted under 35 U.S.C. 154(b) by 395 days.

(21) Appl. No.: 12/861,478

(22) Filed: Aug. 23, 2010

(65) Prior Publication Data

US 2012/0047279 A1 Feb. 23, 2012

(51) Int. Cl.
*G06F 15/16* (2006.01)

(52) U.S. Cl.
USPC .......................... 709/231; 709/230; 709/232

(58) Field of Classification Search
USPC .................................. 709/231, 232, 233, 234
See application file for complete search history.

(56) References Cited

U.S. PATENT DOCUMENTS

| | | | |
|---|---|---|---|
| 2003/0112754 A1* | 6/2003 | Ramani et al. ................ | 370/230 |
| 2005/0100229 A1* | 5/2005 | Becker et al. ................. | 382/232 |
| 2005/0195740 A1* | 9/2005 | Kwon ........................... | 370/229 |
| 2006/0045011 A1* | 3/2006 | Aghvami et al. ............. | 370/230 |
| 2006/0064234 A1* | 3/2006 | Kumagai et al. ............. | 701/117 |
| 2006/0156201 A1* | 7/2006 | Zhang et al. .................. | 714/776 |
| 2006/0285594 A1* | 12/2006 | Kim et al. ................ | 375/240.16 |
| 2008/0069201 A1* | 3/2008 | Zhu et al. .................. | 375/240.1 |
| 2010/0135210 A1* | 6/2010 | Kim et al. ..................... | 370/328 |
| 2011/0032935 A1* | 2/2011 | Yang ............................ | 370/389 |
| 2011/0296485 A1* | 12/2011 | Nilsson et al. ............... | 725/114 |

* cited by examiner

*Primary Examiner* — Dhairya A Patel

(74) *Attorney, Agent, or Firm* — Merchant & Gould

(57) ABSTRACT

Media-aware and TCP-compatible bandwidth sharing may be provided. In various embodiments, a network node may periodically update a virtual congestion level for a transmission stream in a network. The transmission stream may comprise at least one video stream and at least one data stream. The network node may then calculate, based at least in part on the virtual congestion level, a random packet marking probability or a random packet drop probability. In turn, the network node may either drop or mark transmission packets according to the calculated marking and dropping probability. The network node may further calculate an optimal video transmission rate for the at least one video stream and adjust a video transmission rate for the at least one video stream accordingly. Rate-distortions parameters for the at least one video stream may influence the optimal video transmission rate calculation for the at least one video stream.

17 Claims, 6 Drawing Sheets

MEDIA-AWARE AND TCP-COMPATIBLE BANDWIDTH SHARING FOR VIDEO STREAMING

TECHNICAL-FIELD

The present disclosure relates generally to bandwidth sharing across multiple protocols.

BACKGROUND

Bandwidth sharing schemes typically aim at allocating equal transmission rates among competing flows with an underlying assumption that the competing flows bear the same rate utility functions. Such approaches may result in equal rates for all video streams, regardless of their difference in rate utilities. For the benefit of video stream quality, however, it may be preferable that different video streams receive different portions of a bottleneck bandwidth according to their rate utilities.

BRIEF DESCRIPTION OF THE DRAWINGS

Many aspects of the disclosure can be better understood with reference to the following drawings. The components in the drawings are not necessarily to scale. Emphasis is instead placed upon clearly illustrating the principles of the present disclosure. Moreover, in the drawings, like references numerals designate corresponding parts through the several figures.

DETAILED DESCRIPTION OF EXAMPLE EMBODIMENTS

Overview

Figure 1:
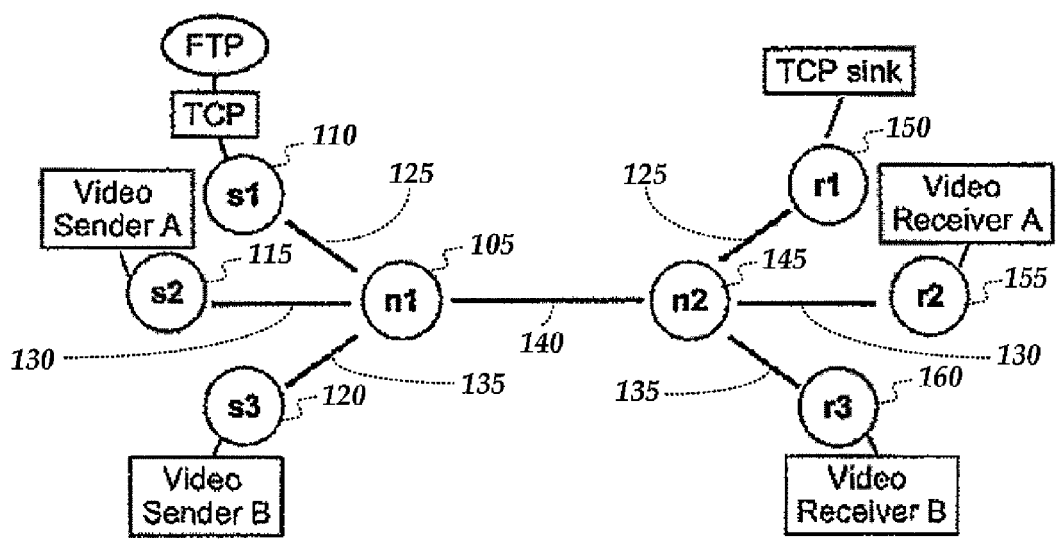
FIG. 1 is a block diagram illustrating an example environment in which certain embodiments of media-aware and TCP-compatible bandwidth sharing may be implemented.

Media-aware and TCP-compatible bandwidth sharing may be provided. In various embodiments, a network node may periodically update a virtual congestion level for a transmission stream in a network. The transmission stream may comprise at least one video stream and at least one data stream. The network node may then calculate, based at least in part on the virtual congestion level, a random packet marking probability when the network is Explicit Congestion Notification (ECN) compatible or a random packet drop probability when the network is not ECN compatible. In turn, the network node may either drop or mark transmission packets according to the calculated packet marking or packet dropping probability. The network node may further calculate an optimal video transmission rate for the at least one video stream and adjust a video transmission rate for the at least one video stream accordingly. Rate-distortions parameters for the at least one video stream may influence the optimal video transmission rate calculation for the at least one video stream.

Consistent with embodiments of media-aware and TCP-compatible bandwidth sharing, a receiving network node may maintain a record of the randomly marked or dropped transmission packets and recover the virtual congestion level of the transmission stream. The receiver may then report the recovered virtual congestion level to the network node. The network node may then consider the recovered virtual congestion level when calculating the optimal video transmission rate.

Example Embodiments

Many systems supporting the coexistence of transmission control protocol (TCP) and video traffic, e.g., TCP-Friendly Rate Control (TFRC), regulate an outgoing rate of a video stream with a bandwidth share received by an equivalent TCP flow. Such systems may result in equal transmission rates for all video streams, regardless of their difference in rate utilities. For the benefit of video stream quality, however, it may be preferable that different video streams receive different portions of the bottleneck bandwidth according to the video streams' corresponding rate utilities. For instance, a video stream containing dynamic action scenes may need a higher rate to achieve the same visual quality as a stream containing head-and-shoulder news sequences. Such bandwidth allocation may be known as media-aware bandwidth allocation.

Embodiments of media-aware and TCP-compatible bandwidth sharing may provide for a video streams' coexistence with TCP traffic while maintaining media-aware bandwidth allocation among the video streams. Furthermore, in networks where traffic congestion indications may be inferred from end-to-end observations, embodiments may lead to more balanced video qualities among the video streams than that of conventional TCP-friendly solutions. Moreover, in networks that may support an ECN mechanism, embodiments may preserve the benefits of explicit network feedback for video streaming so as to provide low queuing delay, fast convergence, and an avoidance of persistent packet losses for streaming video.

Unlike existing schemes based on TFRC for video stream transmission, embodiments of media-aware and TCP-compatible bandwidth sharing may allow video streams to share bandwidth in a media-aware fashion. In this way, instead of constraining video streams to send at a rate equivalent to a TCP flow, the TCP flow may be transmitted at an average throughput equivalent to a video stream with intermediate rate-distortion (R-D) characteristics. In addition, embodiments may allow video and TCP traffic to share the same queue. In this way, all transmission packets may be handled in the same manner, without the need to distinguish among traffic types. Accordingly, embodiments may not require modification for TCP agents in existing network configurations.

It should be understood that while certain embodiments are disclosed herein, the calculation of virtual congestion levels and the calculation of optimal video rates may be performed at different entities. In some embodiments, network nodes may exist in the middle of the network where the nodes do not have access to video R-D information. The network nodes may further perform virtual congestion level calculations and randomly drop and/or mark packets only. Similarly, embodiments of the invention may comprises a sending node which only performs video rate calculations and adaptations based on the virtual congestion levels reported by the receiver. A video sending node may be implemented as application-layer software programs, without any network functionality.

FIG. 1 is a block diagram illustrating a network environment 100 in which certain embodiments of media-aware and TCP-compatible bandwidth sharing may be implemented. Network environment 100 may comprise, for example, a subscriber television network, though other networks are contemplated to be within the scope of this disclosure. Network environment 100 may include a plurality of individual networks, such as a wireless network and/or a wired network, including wide-area networks (WANs), local area networks (LANs), among others.

Network environment 100 may comprise a first network node 105. First network node 105 may be, for example, a headend that: receives and/or generates video content, audio content, and/or other content (e.g., data) sourced at least in part from one or more service providers and/or data and video transmitting nodes 110, 115, and 120; processes and/or stores data and video transmission stream 125, 130, and 135; and delivers the content over a transmission stream 140 to a second network node 145.

First network node 105 and transmitting nodes 110, 115, and 120 may also comprise other components, such as QAM modulators, routers, bridges, Internet Service Provider (ISP) facility servers, private servers, on-demand servers, multimedia messaging servers, program guide servers, gateways, multiplexers, and/or transmitters, among other equipment, components, and/or computing and communication devices. Communication of data, video, or audio packets between transmitting nodes 110, 115, and 120 and the first network node 105 may be implemented according to one or more of a plurality of different protocols, such as user datagram protocol (UDP) and a transmission control protocol/internet protocol (TCP/IP).

Accordingly, transmission stream 140 may comprise video streams 130 and 135 and data stream 125. Data stream 125 may originate from data transmitting node 110 while video streams 130 and 135 may originate from video transmitting nodes 115 and 120, respectively. Though network environment 100 is illustrated to comprise only one data transmission node, in various embodiments, network environment 100 may comprise multiple data transmitting nodes as well as multiple video transmitting nodes.

Transmitting nodes 110, 115, and 120 may provide the video and data streams 125, 130, and 135 to first network node 105 which may propagate the video and data streams 125, 130, and 135, via transmission stream 140, to second network node 145. Second network node 145 may then route data stream 125 to data receiving node 150 and video streams 130 and 135 to their respective video receiving nodes 155 and 160.

In various embodiments, receiving nodes 150, 155, and 160 may comprise set-top boxes coupled to, or integrated with, a display device (e.g., television, computer monitor, etc.) or other communication devices and further coupled to transmission stream 140 (e.g., hybrid-fiber coaxial (HFC) medium, coaxial, optical, twisted pair, etc.) via a wired connection (e.g., via coax from a tap) or wireless connection (e.g., satellite).

Embodiments of media-aware and TCP-compatible bandwidth sharing may be implemented in hardware, software, firmware, or a combination thereof (collectively or individually also referred to herein as logic). To the extent certain embodiments, or portions thereof, are implemented in software or firmware, executable instructions or code for performing one or more tasks of media-aware and TCP-compatible bandwidth sharing are stored in memory or any other suitable computer readable medium and executed by a suitable instruction execution system. In the context of this document, a computer readable medium is an electronic, magnetic, optical, or other physical device or means that can contain or store a computer program for use by or in connection with a computer related system or method.

To the extent certain embodiments, or portions thereof, are implemented in hardware, media-aware and TCP-compatible bandwidth sharing may be implemented with any or a combination of the following technologies: a discrete logic circuit(s) having logic gates for implementing logic functions upon data signals, an application specific integrated circuit (ASIC) having appropriate combinational logic gates, programmable hardware such as a programmable gate array(s) (PGA), a field programmable gate array (FPGA), etc.

Media-aware and TCP-compatible bandwidth sharing may be realized by optimizing bandwidth allocation among competing video streams 130 and 135 such that bottleneck links within transmission stream 140 may be efficiently utilized and total video distortion of video streams 130 and 135 may be minimized. Such optimization may be performed in a distributed manner. For example, referring again to FIG. 1, optimization calculations may be made at: video transmitting nodes 115 and 120 which may provide at least a portion of transmission stream 140; and network nodes 105 and 145 which may be operative to receive and propagate transmission stream 140.

In various embodiments, calculations at either of the first network node 105 and the second network node 145 may periodically update a virtual congestion level based on a difference of current traffic rate and target link utilization. Network nodes 105 and 145 may then linearly map a value of the virtual congestion level in a random marking/dropping probability for traversing transmission packets. In networks with ECN support, packets may be randomly marked, while in various other networks, the packets may be randomly dropped according to the mapped probability.

Consistent with embodiments of media-aware and TCP-compatible bandwidth sharing, calculations at a video sender (e.g., video transmitting nodes 115 and 120) may depend both on the end-to-end packet marking/dropping and on the video streams' rate-distortion (R-D) parameters. For example, considering the same packet marking/dropping probability for multiple streams, a stream with a more demanding R-D characteristic (e.g., fast-moving scenes in an action movie) may be allocated a higher rate than simpler stream (e.g., head- and shoulder news clips).

As mentioned above, conventional bandwidth sharing schemes may typically aim at allocating equal transmission rates among competing flows with the underlying assumption that the flows bear the same rate utility functions. This may be known as a fair-rate allocation scheme. Embodiments of media-aware and TCP-compatible bandwidth sharing may instead share the bandwidth among competing video streams in a media-aware fashion by adapting the allocated rate of each video stream according to its R-D characteristics.

Figure 2A:
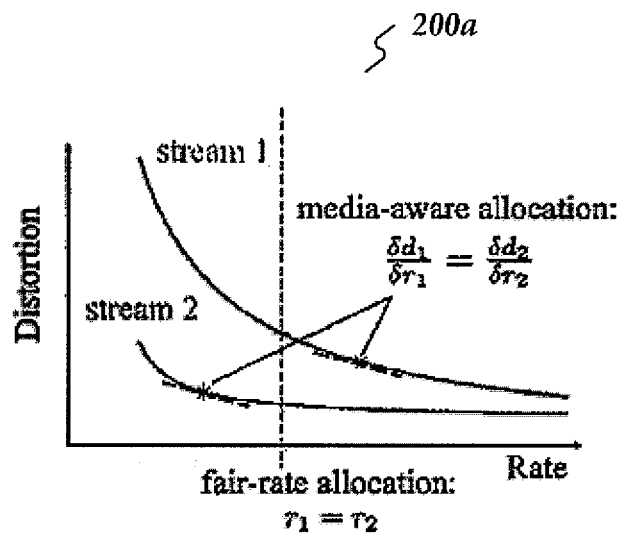
FIGS. 2A-2B illustrate a comparison of certain embodiments of media-aware rate allocation.
Figure 2B:
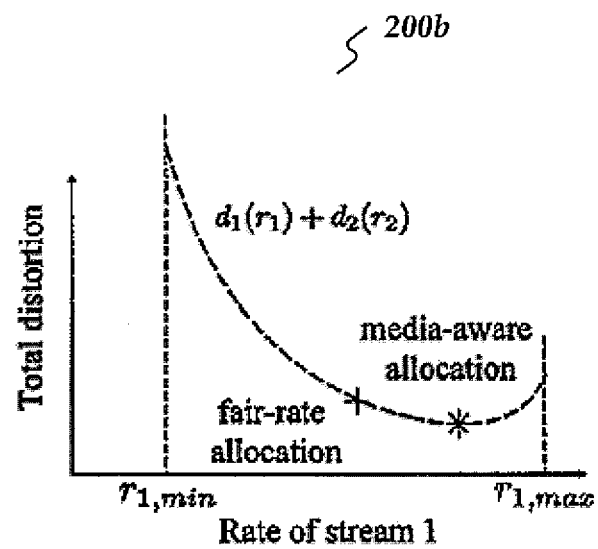

FIGS. 2A and 2B highlight the difference between the fair-rate and media-aware allocation schemes. FIG. 2A depicts a fair-rate allocation graph 200a. The fair-rate allocation scheme arrives at $r_1 = r_2$ for two competing streams 1 and 2 with different R-D curves, with r referring to the allocation rate and d referring to the resulting distortion. As shown in graph 200a, the video distortion may be excessively high for more complex stream 1 and unduly low for the other stream 2. FIG. 2B depicts a media-aware allocation graph 200b. In contrast to the fair-rate allocation scheme, media-aware allocation may achieve minimum total distortion by choosing a rate pair that satisfies the Pareto optimality condition: $\partial d_1 / \partial r_1 = \partial d_2 / \partial r_2$, while meeting the same total rate constraint as in the fair-rate allocation. Accordingly, to minimize the total distortion of all streams, while achieving target utilization at the bottleneck link, the following optimization equations may be solved:

$$\min_{\{r_i\}} \sum_i d_i(r_i) \quad (1)$$

$$\text{s.t.} \quad y_l = r'_l + \sum_{i:l \in i} r_i \le \gamma c_l \ldots \quad (2)$$

where $d_i(r_i)$ denotes the R-D function of each video stream; $c_1$ denotes the capacity of the bottleneck link; $y_1$ denotes the total rate over the link which is comprised of the rates of all video streams $r_i$'s and the rates of all non-video streams $r'_i$ traversing the link; and $\gamma$ denotes the target utilization chosen to be slightly less than unity.

The video R-D tradeoff curves may be characterized by the following parametric model:

$$d_i(r_i) = d_i^0 + \frac{\theta_i}{r_i - r_i^0} \cdot \ldots \quad (3)$$

where the parameters $d^0{}_i$, $r^0{}_i$ and $\theta_i$ may be fitted from empirical R-D points of a pre-encoded video stream i for every group of pictures (GOP) in the video stream.

Embodiments of media-aware and TCP-compatible bandwidth sharing may implement solutions to equations (1)-(2) at various points within network 100. By way of non-limiting example, an algorithm may run at, for example, first network node 105, and an algorithm may run at, for example, video transmitting node 115. As previously mentioned, such implementation may not require modification to TCP agents within network environment 100.

According to various embodiments, at the network node (e.g., first network node 105), a virtual congestion level $q_1$ may be updated periodically as follows:

$$q_l(t) = q_l(t-\tau) + \kappa\left(\frac{y_l(t)}{c_l} - \gamma\right)\tau. \ldots \quad (4)$$

where $y_1(t)$ denotes estimated incoming traffic rate; $c_1$ denotes link capacity; $\gamma$ denotes the target utilization ration; $\tau$ denotes an update interval; and $\kappa$ denotes a scaling factor for the update size.

A random marking/drop probability $p_1$ may then be calculated as $p_1 = \alpha_1 q_1$. In networks where ECN is supported, the network node (e.g., first network node 105) may mark the Congestion-Experienced (CE) bit within an Internet Protocol (IP) header of traversing packet with a probability of $p_1$. If network support for ECN does not exist, then the network node (e.g., first network node 105) may randomly drop a packet with probability $p_1$.

Network nodes consistent with embodiments of media-aware and TCP-compatible bandwidth sharing need not consider the traffic types, treating all traversing packets in the same manner. Furthermore, network nodes consistent with the embodiments need not maintain per-flow state information when performing its calculations.

According to various embodiments, a video receiver (e.g., video receiving node 155) may keep account of a ratio of randomly marked/dropped packets asp, and may recover the virtual congestion level as $q=p/\alpha$. The receiver may keep account of the ratio by, for example, maintaining a record of the randomly marked/dropped packets in a memory storage connected to the video receiver or in remote communication with the video receiver. The conversion factor $\alpha$ may be different from the $\alpha_1$'s chosen at the network node. The receiver may then report the value of q in an application-layer packet header field to the sender. Subsequently, the sender may calculate an optimal video rate as follows:

$$r_i(t) = \underset{r_i}{\operatorname{argmin}}[d_i(r_i) + \hat{q}(t)r_i] = r_i^0 + \sqrt{\frac{\theta_i}{\hat{q}}} \approx \sqrt{\frac{\theta_i}{\hat{q}}}, \ldots \quad (5)$$

where $\theta_i$ and $r^0{}_i$ are parameters for the video stream's rate utility function. In various embodiments, the value of $r^0{}_i$ may be typically much smaller in comparison with $r_i(t)$, hence it may be omitted. It may also be noted that q may be considered a low-pass filtered observation of the virtual congestion level q calculated at the bottleneck link.

Figure 3:
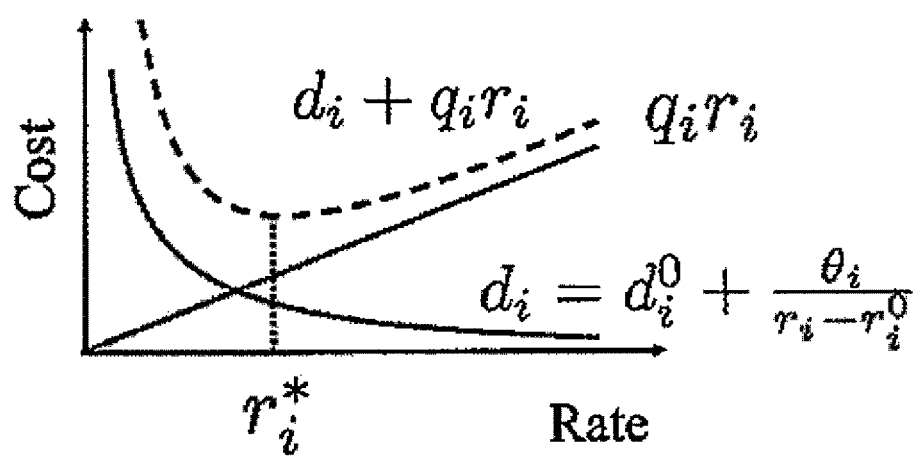
FIG. 3 is a graph depicting optimal rate calculation.

As illustrated in FIG. 3, an optimal allocation may balance between the competing needs of increasing rate to reduce video distortion, and decreasing rate to avoid network congestion. A higher virtual congestion level may lead to a lower allocated rate whereas a lower virtual congestion level may encourage a higher video rate. In addition, it may be noted from equation (5) that the same value of q may lead to different optimal rates for video streams with different R-D parameters.

In accordance to embodiments of media-aware and TCP-compatible bandwidth sharing, modification may not be required for the TCP flows as long as the TCP sender at data transmission node 110 and TCP receiver at data receiving node 150 react to congestion indication either based on ECN markings or based on detected packet losses. The average TCP throughput may be expressed as:

$$R_{tcp} = \frac{kB}{\tau\sqrt{p}}, \ldots \quad (6)$$

where k denotes the scaling factor; B denotes the average packet size; and $\tau$ denotes round trip time. Accordingly, the average video rate from equation (5) may be rewritten as:

$$R_{video} \approx \frac{\sqrt{\alpha\theta}}{\sqrt{p}}. \quad (7)$$

The same square root dependence on the marking probability p in equation (6) and (7) may allow a TCP flow to compete for bandwidth within the same framework with a video-like rate utility function.

Figure 4A:
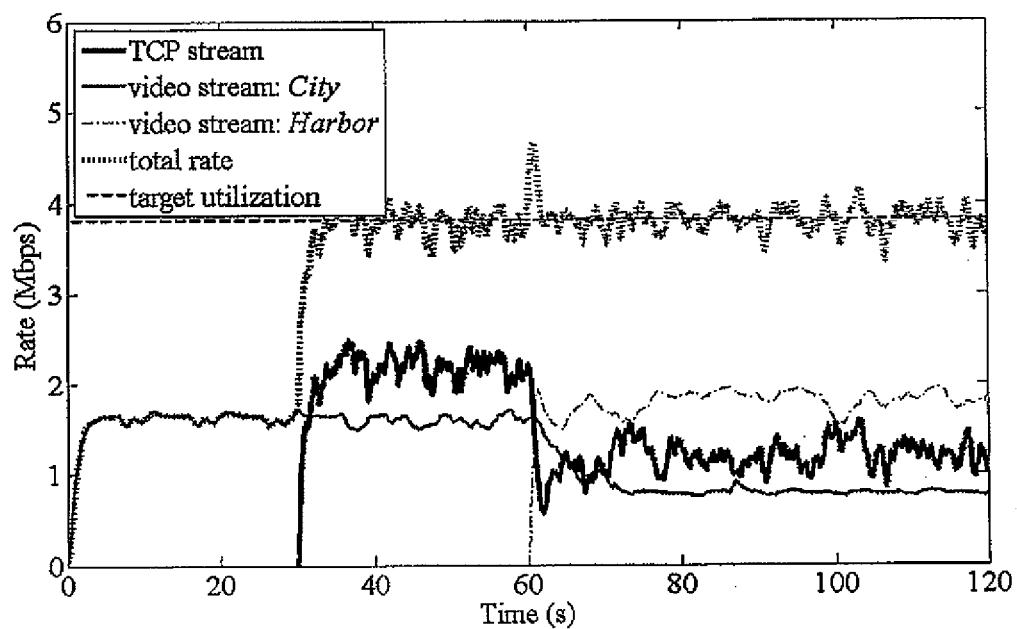
FIGS. 4A-4B illustrate a coexistence of video streams and TCP flows in accordance to certain embodiments of media-aware and TCP-compatible bandwidth sharing.
Figure 4B:
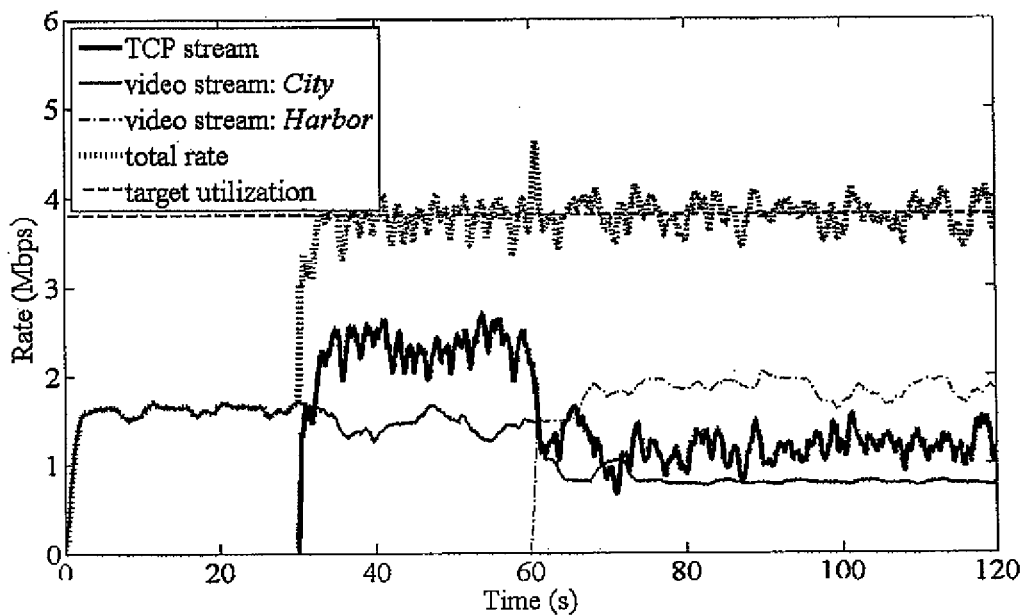

FIGS. 4A and 4B illustrate a network simulation involving two video streams and one TCP flow employing embodiments of media-aware and TCP-compatible bandwidth sharing. FIG. 4A depicts a simulation of a network supporting an ECN framework while FIG. 4B depicts a simulation of a network providing bandwidth allocation based on random packet losses as congestion indication. As illustrated, a bottleneck link with capacity of 4 Mbps may initially accommodate a single City stream at the maximum rate of 1.7 Mbps. An FTP flow over TCP may start at time t=30 s and may obtain the remaining available bandwidth over the link, driving the total traffic rate to the target utilization of 95% of link capacity. Shortly after the second stream Harbor arrives at the link, the rates of both the TCP flow and the City stream may be reduced in response. It may be noted that the TCP flow receives a bandwidth share between the more complex Harbor sequence and the less demanding City sequence.

Figure 5:
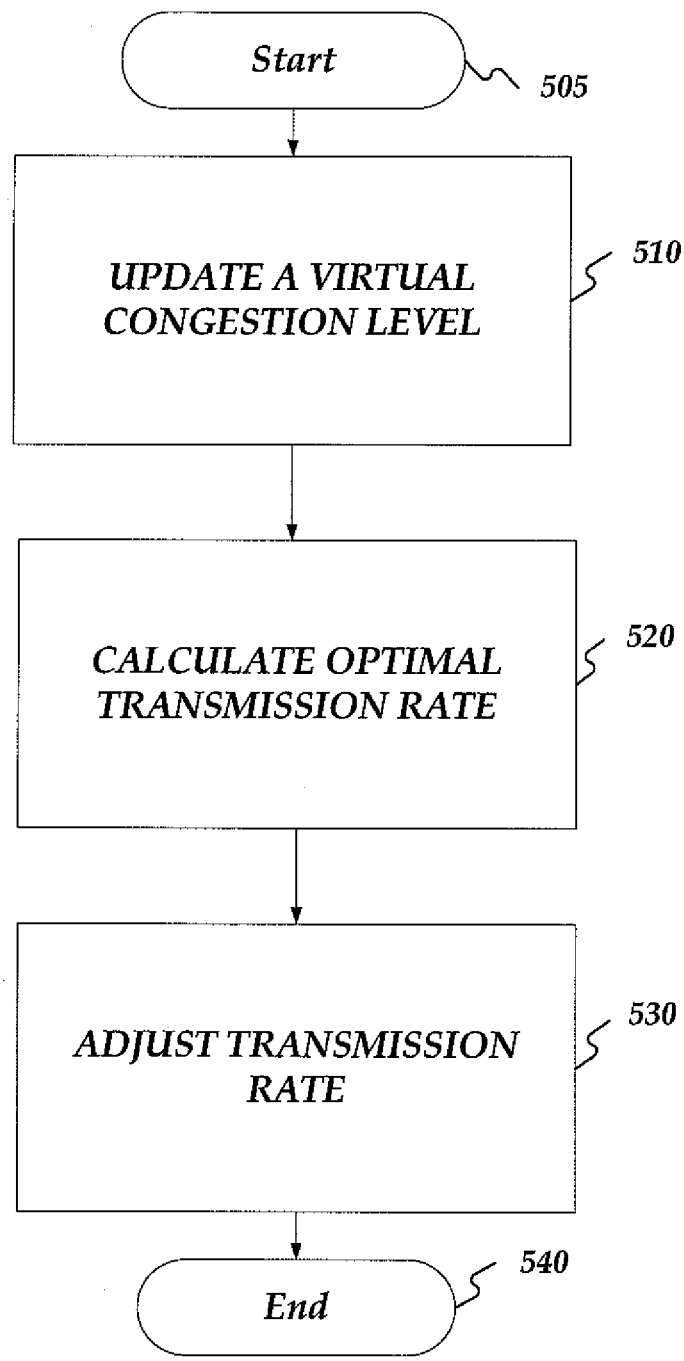
FIG. 5 is a flow chart of a method for providing certain embodiments of media-aware and TCP-compatible bandwidth sharing.

FIG. 5 is a flow chart setting forth the general stages involved in a method 500 consistent with an embodiment for providing media-aware and TCP-compatible bandwidth sharing. Method 500 may be implemented using a network device 600 as described in more detail below with respect to FIG. 6. The network device may comprise, for example, but is not limited to, any transmitting network node device depicted in FIG. 1. Ways to implement the stages of method 500 will be described in greater detail below.

Method 500 may begin at starting block 505 and proceed to stage 510 where network device 600 may periodically update a virtual congestion level for a transmission stream (e.g., transmission stream 140) in a network (e.g., network environment 100). In embodiments where, for example, network device 600 may not itself be a video generating and transmitting device, the network transmission stream (e.g., transmission stream 140) may be received from at least one data transmitting device (e.g., data transmitting node 110) and at least one video transmitting device (e.g., video transmitting nodes 115 and 120). In other embodiments, network device 600 may both generate and transmit either a video stream (e.g., video streams 130 and 135) and/or a data stream (e.g., data stream 125). Accordingly, the network transmission stream may comprise both video streams and data streams.

Network device 600 may also be configured to calculate either a random packet marking probability or a random pack drop probability for the transmission stream. In embodiments where, for example, the network supports an ECN mechanism, network device 600 may calculate the random packet marking probability. In this way, a CE bit may be marked within an IP header of traversing packets within the calculated packet marking probability. In other embodiments where, for example, the network does not support an ECN mechanism, network device 600 may calculate the random packet drop probability. In this way, network device 600 may randomly drop transmission packets with the calculated packet drop probability.

From stage 510, where network device 600 updates the virtual congestion level for the network transmission stream, method 500 may advance to stage 520 where network device 600 may calculate an optimal video transmission rate. Each video stream (e.g., video streams 130 and 135) in the transmission stream may have parameters, such as R-D parameters, associated with its corresponding video rate's utility function. The optimal video transmission rate, for each transmission stream, may be calculated based at least in part on such R-D parameters.

Moreover, in various embodiments, a device receiving the transmission stream (e.g., receiving nodes 150, 155, and 160) may keep account of a ratio of randomly dropped or marked packets. The receiving device may then recover a virtual congestion level based on its account of the randomly dropped or marked packets. The recovered virtual congestion level may be reported to network device 600 in an application-layer packet header field. Accordingly, network device 600 may consider the recovered virtual congestion level when calculating the optimal video rate for each video stream.

After network device 600 calculates the optimal video transmission rate in stage 520, method 500 may proceed to stage 530 where network device 600 may adjust a video transmission rate of each video stream. For example, each video stream transmission rate may be adjusted to correspond to the calculated optimal video stream transmission rate for the corresponding video stream. In this way, optimal bandwidth allocation may be balanced between the competing needs of increased rate to reduce video distortion and decreased rate to avoid network congestion. Once network device 600 adjusts the video transmission stream in stage 530, method 500 may then end at stage 540.

Figure 6:
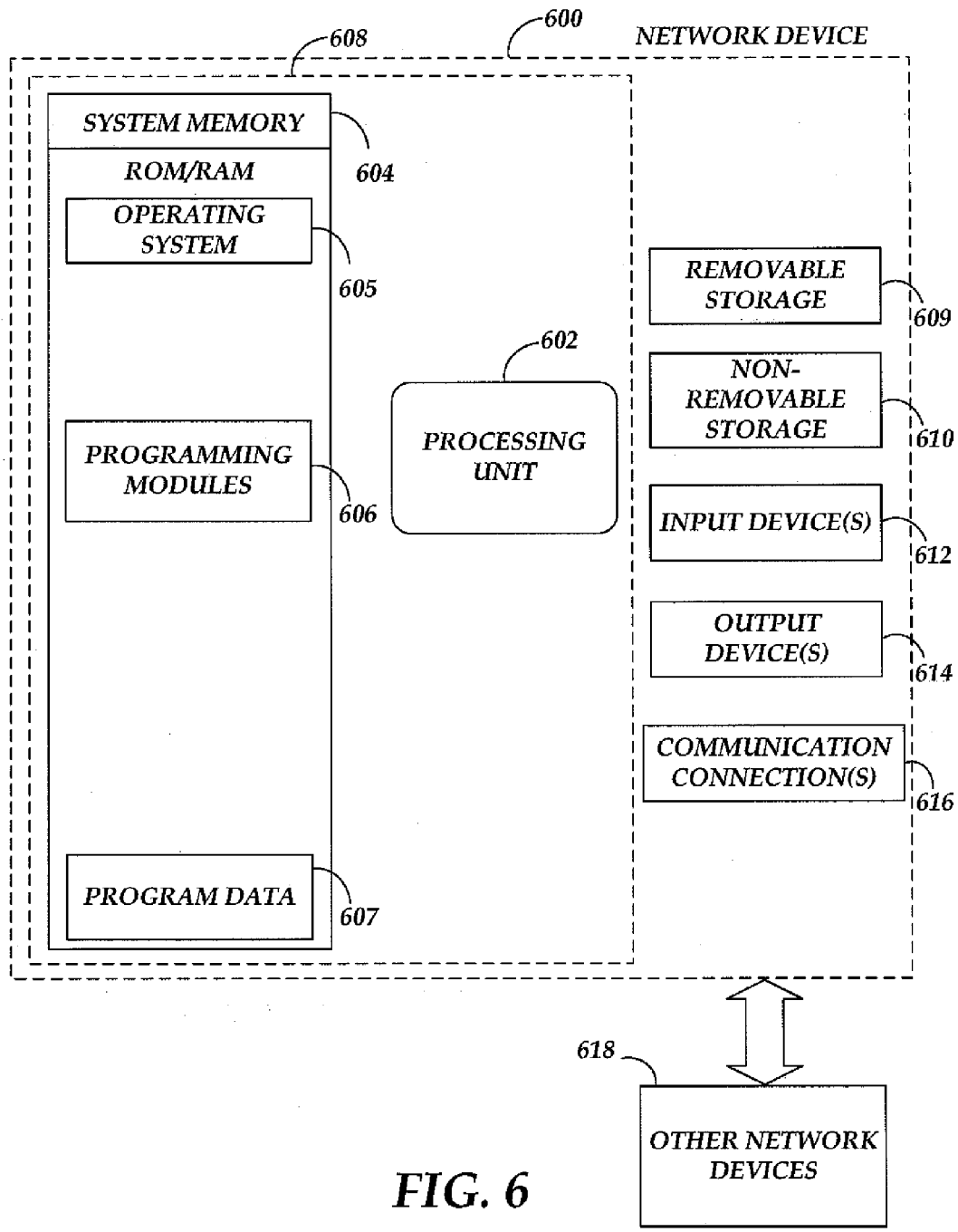
FIG. 6 is a block diagram of a system including a network device.

FIG. 6 is a block diagram of a system including network device 600. Consistent with embodiments of media-aware and TCP-compatible bandwidth sharing, the aforementioned memory storage and processing unit may be implemented in a network device, such as network device 600 of FIG. 6. Any suitable combination of hardware, software, or firmware may be used to implement the memory storage and processing unit. For example, the memory storage and processing unit may be implemented with network device 600 or any of other network devices 618, in combination with network device 600. The aforementioned system, device, and processors are examples and other systems, devices, and processors may comprise the aforementioned memory storage and processing unit, consistent with embodiments of media-aware and TCP-compatible bandwidth sharing. Furthermore, network device 600 may comprise an operating environment for system 100 as described above. System 100 may operate in other environments and is not limited to network device 600.

With reference to FIG. 6, a system consistent with embodiments of media-aware and TCP-compatible bandwidth sharing may include a network device, such as network device 600. In a basic configuration, network device 600 may include at least one processing unit 602 and a system memory 604. Depending on the configuration and type of network device, system memory 604 may comprise, but is not limited to, volatile (e.g., random access memory (RAM)), non-volatile (e.g., read-only memory (ROM)), flash memory, or any combination. System memory 604 may include operating system 605, one or more programming modules 606, and may include a program data 607. Operating system 605, for example, may be suitable for controlling network device 600's operation. Furthermore, embodiments of media-aware and TCP-compatible bandwidth sharing may be practiced in conjunction with a graphics library, other operating systems, or any other application program and is not limited to any particular application or system. This basic configuration is illustrated in FIG. 6 by those components within a dashed line 608.

Network device 600 may have additional features or functionality. For example, network device 600 may also include additional data storage devices (removable and/or non-removable) such as, for example, magnetic disks, optical disks, or tape. Such additional storage is illustrated in FIG. 6 by a removable storage 609 and a non-removable storage 610. Computer storage media may include volatile and nonvolatile, removable and non-removable media implemented in any method or technology for storage of information, such as computer readable instructions, data structures, program modules, or other data. System memory 604, removable storage 609, and non-removable storage 610 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by network device 600. Any such computer storage media may be part of device 600. Network device 600 may also have input device(s) 612 such as a keyboard, a mouse, a pen, a sound input device, a touch input device, etc. Output device(s) 614 such as a display, speakers, a printer, etc. may also be included. The aforementioned devices are examples and others may be used.

Network device 600 may also contain a communication connection 616 that may allow device 600 to communicate with other network devices 618, such as over a network in a distributed network environment, for example, an intranet or the Internet. Communication connection 616 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both storage media and communication media.

As stated above, a number of program modules and data files may be stored in system memory 604, including operating system 605. While executing on processing unit 602, programming modules 606 may perform processes including, for example, one or more method 500's stages as described above. The aforementioned process is an example, and processing unit 602 may perform other processes.

Generally, consistent with embodiments of media-aware and TCP-compatible bandwidth sharing, program modules may include routines, programs, components, data structures, and other types of structures that may perform particular tasks or that may implement particular abstract data types. Moreover, embodiments may be practiced with other computer system configurations, including hand-held devices, multiprocessor systems, microprocessor-based or programmable consumer electronics, minicomputers, mainframe computers, and the like. Embodiments of media-aware and TCP-compatible bandwidth sharing may also be practiced in distributed network environments where tasks are performed by remote processing devices that are linked through a communications network. In a distributed network environment, program modules may be located in both local and remote memory storage devices.

Furthermore, embodiments of media-aware and TCP-compatible bandwidth sharing may be practiced in an electrical circuit comprising discrete electronic elements, packaged or integrated electronic chips containing logic gates, a circuit utilizing a microprocessor, or on a single chip containing electronic elements or microprocessors. Embodiments may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

Embodiments of media-aware and TCP-compatible bandwidth sharing, for example, may be implemented as a computer process (method), a network system, or as an article of manufacture, such as a computer program product or computer readable media. The computer program product may be a computer storage media readable by a computer system and encoding a computer program of instructions for executing a computer process. The computer program product may also be a propagated signal on a carrier readable by a network system and encoding a computer program of instructions for executing a computer process. Accordingly, aspects of media-aware and TCP-compatible bandwidth sharing may be embodied in hardware and/or in software (including firmware, resident software, micro-code, etc.). In other words, embodiments of media-aware and TCP-compatible bandwidth sharing may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of media-aware and TCP-compatible bandwidth sharing, for example, are described above with reference to block diagrams and/or operational illustrations of methods, systems, and computer program products according to embodiments of media-aware and TCP-compatible bandwidth sharing. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of media-aware and TCP-compatible bandwidth sharing have been described, other embodiments may exist. Furthermore, although embodiments have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the invention.

While the specification includes examples, the invention's scope is indicated by the following claims. Furthermore, while the specification has been described in language specific to structural features and/or methodological acts, the claims are not limited to the features or acts described above. Rather, the specific features and acts described above are disclosed as example for embodiments of media-aware and TCP-compatible bandwidth sharing.

At least the following is claimed:

1. A method comprising:
updating, periodically, a virtual congestion level for a transmission stream, the transmission stream comprising at least one video stream and at least one data stream;
calculating optimization equations to minimize a total distortion of all video and data by solving:

$$\min_{\{r_i\}} \sum_i d_i(r_i) \text{ and } s.t. \ y_l = r'_i + \sum_{id \in i} r_i \leq \gamma c_l$$

wherein $d_i(r_i)$ denotes the R-D function of each video stream, $c_1$ denotes the capacity of the bottleneck link, $y_1$ denotes the total rate over the link which is comprised of the rates of all video streams $r_i$'s and the rates of all data streams $r'_1$ traversing the link, and $\gamma$ denotes the target utilization chosen to be slightly less than unity;
characterizing the video R-D tradeoff curves as:

$$d_i(r_i) = d_i^0 + \frac{\theta_i}{r_i - r_i^0},$$

where the parameters $d^0{}_i$, $r^0{}_i$, and $\theta_i$ may be fitted from empirical R-D points of a pre-encoded video stream i for every group of pictures (GOP) in the video stream;
updating the virtual congestion level $q_1$ periodically as follows:

$$q_l(t) = q_l(t - \tau) + \kappa \left( \frac{y_l(t)}{c_l} - \gamma \right) \tau.$$

wherein $y_1(t)$ denotes an estimated incoming traffic rate, $c_1$ denotes link capacity, $\gamma$ denotes the target utilization ration, $\tau$ denotes an update interval, and $\kappa$ denotes a scaling factor for an update size;
calculating a new video transmission rate for the at least one video stream based at least in part on the updated virtual congestion level from the transmission stream and at least one rate-distortion parameter (R-D) associated with at least one video stream R-D tradeoff curves;
adjusting a current video transmission rate for the at least one video stream based on the new video transmission rate;
calculating the random packet marking probability when the transmission stream is part of a network with Explicit Congestion Notification (ECN) support, wherein the calculation comprises linearly mapping the virtual congestion level to the random packet marking probability; and
calculating the random packet drop probability when the transmission stream is not part of the network with ECN support, wherein the calculation comprises linearly mapping the virtual congestion level to the random packet drop probability.

2. The method of claim 1, further comprising:
marking a bit within a transmission packet of the transmission stream with the calculated packet marking probability within the network with ECN support; and
dropping a transmission packet of the transmission stream with the calculated packet drop probability not within the network with ECN support.

3. The method of claim 1, further comprising receiving a recovered virtual congestion level from a network device receiving the transmission stream.

4. The method of claim 3, wherein calculating the new video transmission rate comprising calculating the new video transmission based at least in part on the recovered virtual congestion level.

5. The method of claim 3, wherein receiving the recovered virtual congestion level comprises receiving the recovered virtual congestion level comprising a low-pass filtered observation of the calculated virtual congestion level.

6. The method of claim 1, wherein periodically updating the virtual congestion level for the transmission stream comprises periodically updating the virtual congestion level based at least in part on a difference of a current transmission traffic rate and a target link utilization for the transmission stream.

7. The method of claim 1, further comprising receiving the transmission stream from at least one of the following: at least one video stream transmitting device and at least one data stream transmitting device.

8. The method of claim 1, wherein adjusting the video transmission rate for the at least one video stream comprises allocating a higher video transmission rate for the at least one video stream when the at least one video steam has an R-D parameter requiring the higher video transmission rate.

9. A system comprising:
a network node device configured to:
update, periodically, a virtual congestion level for a transmission stream comprising at least one data stream and at least one video stream,
calculate, based at least in part on the virtual congestion level, a random packet marking probability when the transmission stream is part of an Explicit Congestion Notification (ECN) compatible network,
calculate, based at least in part on the virtual congestion level, a random packet drop probability when the transmission stream is not part of the ECN compatible network, and adjust the video transmission rate for the at least one video stream; and
a receiving node device in communication with the network node device, the receiving node device being configured to:
maintain a first record of marked packets when the transmission stream is part of the ECN compatible network,
maintain a second record of dropped packets when the transmission stream is not part of the ECN compatible network,
calculate a recovered virtual congestion level based at least in part on the recorded one of the following: the marked packets and the dropped packets, wherein the calculation-comprises linearly mapping the virtual congestion level to the one of the following: the random packet marking probability and the random packet drop probability, and transmit the recovered virtual congestion level to the network node device.

10. The system of claim 9, wherein the network node is further configured to:
mark a bit within a transmission packet of the transmission stream with the calculated packet marking probability when the transmission stream is within the ECN compatible network; and
drop a transmission packet of the transmission stream with the calculated packet marking probability with the calculated packet drop probability when the transmission stream is not within the ECN compatible network.

11. The system of claim 9, further comprising a transmitting node device in communication with the network node, the transmitting node device being configured to:
 transmit a video stream portion of the transmission stream,
 receive the recovered virtual congestion level transmitted from the receiving node device,
 calculate the video transmission rate based at least in part on the received recovered virtual congestion level, and
 adjust the video transmission rate.

12. The system of claim 11, wherein the network device is further configured to receive the transmission stream from the transmitting node device.

13. The system of claim 9, wherein the video transmission stream is associated with at least one rate-distortion (R-D) parameter and wherein the video transmission rate is adjusted based at least in part on the at least one R-D parameter.

14. The system of claim 9, wherein the network node is further operative to linearly map the virtual congestion level to the calculated one of the following: the random packet marking probability and the random packet drop probability.

15. The system of claim 9, wherein the virtual congestion level is based at least in part on an estimated incoming traffic rate, transmission stream link capacity, and a target link utilization ration, an update interval.

16. A system comprising:
 a transmitting node device configured to:
 transmit a video stream portion of a transmission stream comprising at least one video stream and at least one data stream,
 update, periodically, a virtual congestion level for the transmission stream,
 when the transmission stream is within an Explicit Congestion Notification (ECN) compatible network:
  calculate, based at least in part on the virtual congestion level, a random packet marking probability, and mark a bit within a first transmission packet of the transmission stream according to the calculated random packet marking probability, when the transmission stream is not within the ECN compatible network:
  calculate, based at least in part on the virtual congestion level, a random packet drop probability, and
  drop a second transmission packet of the transmission stream according to the calculated random packet drop probability, and
 adjust the video transmission rate for the at least one video stream; and
 a receiving node device in communication with the transmitting node device, the receiving node device being configured to:
 maintain a first record of marked packets when the transmission stream is within the ECN compatible network,
 maintain a second record of randomly dropped packets when the transmission stream is within of the ECN compatible network,
 calculate a recovered virtual congestion level based at least in part on the recorded one of the following: the marked packets and the dropped packets,
 transmit the recovered virtual congestion level to the transmitting node device; and
 linearly map the virtual congestion level to the calculated one of the following: the random packet marking probability.

17. The system of claim 16, wherein the video transmission stream is associated with at least one rate-distortion (R-D) parameter and wherein the video transmission rate is adjusted based at least in part on the at least one R-D parameter.

* * * * *